United States Patent
Matsuo et al.

(10) Patent No.: US 12,450,087 B2
(45) Date of Patent: Oct. 21, 2025

(54) DATA PROCESSING SYSTEM THAT PERFORMS STREAM PROCESSING ON RECEIVED DATA AND PERFORMS BATCH PROCESSING ON THE RECEIVED DATA AFTER STORAGE, A FIRST PROCESSING APPARATUS, AND A NON-TRANSITORY COMPUTER-READABLE STORAGE MEDIUM

(71) Applicant: NTT, Inc., Tokyo (JP)

(72) Inventors: Kazuya Matsuo, Musashino (JP); Masaru Takagi, Musashino (JP); Ryota Nakada, Musashino (JP); Koya Mori, Musashino (JP)

(73) Assignee: NTT, Inc., Tokyo (JP)

( * ) Notice: Subject to any disclaimer, the term of this patent is extended or adjusted under 35 U.S.C. 154(b) by 535 days.

(21) Appl. No.: 17/776,082

(22) PCT Filed: Nov. 18, 2019

(86) PCT No.: PCT/JP2019/045085
§ 371 (c)(1),
(2) Date: May 11, 2022

(87) PCT Pub. No.: WO2021/100087
PCT Pub. Date: May 27, 2021

(65) Prior Publication Data
US 2022/0382582 A1    Dec. 1, 2022

(51) Int. Cl.
*G06F 9/48*     (2006.01)
*G06F 9/46*     (2006.01)
(Continued)

(52) U.S. Cl.
CPC .......... *G06F 9/4843* (2013.01); *G06F 16/245* (2019.01); *G06F 16/24568* (2019.01);
(Continued)

(58) Field of Classification Search
None
See application file for complete search history.

(56) References Cited

U.S. PATENT DOCUMENTS 10,726,020 B1 *  7/2020  Hansen ................. G06F 16/245
2007/0016589 A1 *  1/2007  Hara .................... G06F 16/2471
(Continued)

FOREIGN PATENT DOCUMENTS

JP    2018-022372    2/2018

OTHER PUBLICATIONS

Hiroki Matsutani, "Recent Trends in Computing Infrastructure for Utilizing Big Data", General Incorporated Electronic Information Communication Engineers, vol. 100, No. 8, Aug. 1, 2017, 6 pages. (with English Abstract).
(Continued)

*Primary Examiner* — Abu Zar Ghaffari
(74) *Attorney, Agent, or Firm* — XSENSUS LLP (57) ABSTRACT

A data processing system includes a first processing apparatus that performs a first phase of stream processing on received data; a first result providing apparatus that stores a first processing result of the first processing apparatus and replies to a query; a second processing apparatus that performs a second phase of the stream processing on the first processing result received from the first processing apparatus; a second result providing apparatus that stores a second processing result of the second processing apparatus and replies to the query; a storage that stores the received data; a third processing apparatus that performs batch processing on the received data read from the storage at a predetermined timing; and a third result providing apparatus that stores a third processing result of the third processing apparatus and replies to the query.

6 Claims, 6 Drawing Sheets

(51) Int. Cl.
*G06F 16/245* (2019.01)
*G06F 16/2455* (2019.01)
*H04L 65/401* (2022.01)
*G06V 20/58* (2022.01)

(52) U.S. Cl.
CPC .......... *H04L 65/4015* (2013.01); *G06F 9/466* (2013.01); *G06F 2201/805* (2013.01); *G06V 20/58* (2022.01)

(56) References Cited

U.S. PATENT DOCUMENTS

| | | | | |
|---|---|---|---|---|
| 2014/0229506 | A1* | 8/2014 | Lee | G06F 16/24554 707/774 |
| 2015/0256612 | A1* | 9/2015 | Hinni | H04L 41/00 709/202 |
| 2016/0147632 | A1* | 5/2016 | Vazac | H04L 67/02 702/122 |
| 2016/0285711 | A1* | 9/2016 | Akidau | H04L 47/28 |
| 2017/0006135 | A1* | 1/2017 | Siebel | H04L 69/40 |
| 2017/0063902 | A1* | 3/2017 | Muddu | G06F 16/444 |
| 2018/0004818 | A1* | 1/2018 | Sarma | G06F 16/24568 |
| 2018/0113917 | A1* | 4/2018 | Bustelo | G06F 16/24568 |
| 2018/0189350 | A1* | 7/2018 | Imaki | G06F 16/24542 |
| 2018/0332366 | A1* | 11/2018 | Paduroiu | H04N 21/8458 |

OTHER PUBLICATIONS

Yoji Yamato, et al., "Realtime Predictive Maintenance with Lambda Architecture", The Institute of Electronics, Information and Communication Engineers, IEICE Technical Report, vol. 116, No. 287, Oct. 28, 2016, 4 pages. (with English Abstract).
Dutta et al., "Big data analytics for real time systems," Big data analytics seminar, Feb. 2015, pp. 1-13.
ISR in International Appln. No. PCT/JP2019/045085, dated Aug. 25, 2020, 6 pages (with English Translation).
Marz [online], "Big Data Lambda Architecture," databasetube.com, retrieved on Oct. 21, 2019, retrieved from URL <http://www.databasetube.com/database/big-data-lambda-architecture/>, 14 pages.
Nishida, "Lambda Architecture," Technology to Support Big Data, 1st Ed., Gijutsu-Hyohron Co., Ltd., Oct. 5, 2017,:215-217, 6 pages (No English Translation).
Reznik et al., "Developing Software for Multi-Access Edge Computing," ETSI White Paper, Sep. 2017, 20:1-16.
Shindoh, "The IoT Age is Here—Analysis Platforms, Lower Cost Analysis with Amazon," Nikkei Computer, Feb. 20, 2014, 854:44-49, 14 pages (No English Tranlsation).
Nishida, "Lambda Architecture," Technology to Support Big Data, 1st Ed., Gijutsu-Hyohron Co., Ltd., Oct. 5, 2017, 215-217, 8 pages.
Shindoh, "The IoT Age is Here—Analysis Platforms, Lower Cost Analysis with Amazon," Nikkei Computer, Feb. 20, 2014, 854:44-49, 15 pages.

* cited by examiner

DATA PROCESSING SYSTEM THAT PERFORMS STREAM PROCESSING ON RECEIVED DATA AND PERFORMS BATCH PROCESSING ON THE RECEIVED DATA AFTER STORAGE, A FIRST PROCESSING APPARATUS, AND A NON-TRANSITORY COMPUTER-READABLE STORAGE MEDIUM

CROSS-REFERENCE TO RELATED APPLICATIONS

This application is a National Stage application under 35 U.S.C. § 371 of International Application No. PCT/JP2019/045085, having an International Filing Date of Nov. 18, 2019. The disclosure of the prior application is considered part of the disclosure of this application, and is incorporated in its entirety into this application.

TECHNICAL FIELD

The present invention relates to a data processing system, a fast response processing apparatus, and a program.

BACKGROUND ART

In recent years, with spread of Internet of Things (IoT), various familiar devices have come to be connected to the Internet. By linking an application placed on cloud server with an IoT terminal, even if a computing power of the IoT terminal is weak, complicated processing such as data analysis and operation change according to analysis results can be performed as a whole system.

As the number of IoT terminals increases, an amount of data transmitted to the cloud server is increasing, and an increase in network cost and an increase in load on the application on the cloud server have become problems. Further, a faster response from the server is required for connected cars and IoT-enabled factory robots. When a physical distance between the server and the terminal is long, there is a problem in which it is difficult to speed up the response.

Under such a background, edge computing is attracting attention, in which a server is placed in a periphery (an edge) of a network and a part of the application is placed on the server. By using an edge computing environment, it is possible to reduce the data transmitted to the cloud server and speed up the response to the terminal. For example, by arranging a group of processing (hereinafter referred to as a logic) of the application that aggregates information transmitted by the IoT terminal on the edge server, an amount of communication required for transmission of the data to the cloud server can be reduced. By arranging the logic that frequently communicates with the terminal on the edge server, a response time of the application can be reduced.

In order to operate the application in a distributed manner on a plurality of machines, it is necessary to divide the application into a plurality of logics and arrange them on each machine (see NPL 1). However, dividing and arranging the application require the application to be designed in consideration of an operating environment of the application and processing content of the logic, and thus there is a problem in which a large burden is imposed on a developer.

Meanwhile, a model called a lambda architecture is known as a configuration of the application that processes stream data including IoT data in real time (see NPLs 2 and 3). In the lambda architecture, it is possible to obtain both a detailed processing result and an immediate processing result by simultaneously performing batch processing and stream processing for a very large data set. The lambda architecture is used in some commercial applications for IoT. By implementing the application on the basis of the lambda architecture, a user or the terminal that inquires the processing result can obtain a highly accurate detailed processing result as soon as the batch processing is completed while obtaining a temporary processing result in real time.

CITATION LIST

Non Patent Literature

NPL 1: Alex Reznik, et al., "Developing Software for Multi-Access Edge Computing," ETSI White Paper, No. 20, September 2017.

NPL 2: Nathan Marz, "Big Data Lambda Architecture," Internet <www.databasetube.com/database/big-data-lambda-architecture/>

NPL 3: Dutta, K. and Jayapal, M., "Big data analytics for real time systems," Big data analytics seminar, pp. 1-13, 2015.

SUMMARY OF THE INVENTION

Technical Problem

When creating an application based on the lambda architecture in the edge computing environment, the response time can be reduced by simply performing stream processing on the edge server. However, in the lambda architecture, further speed-up of the stream processing is not assumed.

If the user or the terminal using the processing result can tolerate a decrease in accuracy of the processing result, further speed-up of the response can be expected. However, in the lambda architecture, since further speed-up of the stream processing is not assumed, a mechanism capable of realizing this is required.

The present invention has been made in view of the above, and an object of the present invention is to speed up the response in the lambda architecture.

Means for Solving the Problem

A data processing system of one aspect of the present invention is a data processing system that performs stream processing on received data and performs batch processing on the received data after storage, and includes: a fast response processing apparatus configured to perform processing of a part of the stream processing on the received data; a first result providing apparatus configured to store a processing result of the fast response processing apparatus and reply to a query; a real-time processing apparatus configured to perform remaining processing of the stream processing on the received data and the processing result of the fast response processing apparatus; a second result providing apparatus configured to store a processing result of the real-time processing apparatus and reply to a query; a storage configured to store the received data; a batch processing apparatus configured to perform the batch processing on the received data stored in the storage at a predetermined timing; and a third result providing apparatus configured to store a processing result of the batch processing apparatus and reply to a query.

Effects of the Invention

According to the present invention, it is possible to speed up the response in the lambda architecture.

DESCRIPTION OF EMBODIMENTS

Hereinafter, embodiments of the present invention will be described with reference to the accompanying drawings.

Figure 1:
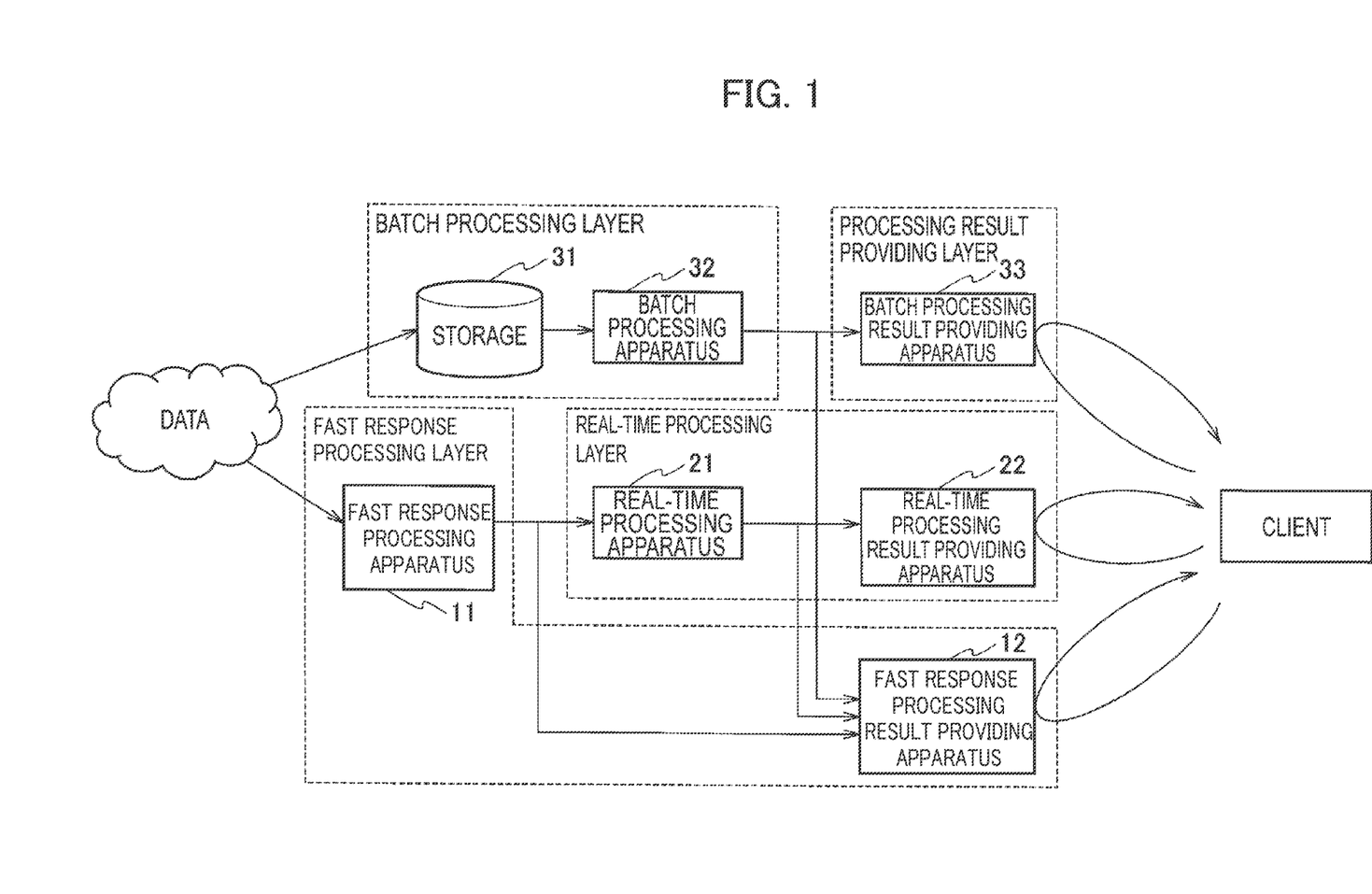
FIG. 1 is a diagram illustrating an outline of a data processing system of the present embodiment.

A data processing system of the present embodiment will be described with reference to FIG. 1. The data processing system illustrated in FIG. 1 includes a fast response processing layer, a real-time processing layer, a batch processing layer, and a processing result providing layer. In the data processing system of the present embodiment, a fast response processing layer is newly added so that a part of processing result can be referred to before the processing result of the real-time processing layer is output.

Data to be processed is transmitted from each of a large number of terminals such as sensors. The data to be processed is transmitted to both the batch processing layer and the fast response processing layer. In the batch processing layer, the received data is stored and the data is batched at predetermined intervals. The fast response processing layer and the real-time processing layer perform stream processing on the received data.

In the present embodiment, a part of stream processing performed by the real-time processing layer is divided as processing in the fast response processing layer. Specifically, based on the data flow in the real-time processing layer, the processing is cut out as the processing in the fast response processing layer in order from the earliest processing. The above procedure is repeated to determine the processing in the fast response processing layer so that total processing time of the fast response processing layer does not exceed a predetermined threshold value. In the fast response processing layer, processing divided from the real-time processing layer is performed, and the processing result is transmitted to the real-time processing layer, and is also held so that a query from a client can be replied. The real-time processing layer takes over the data and the processing result, and performs remaining processing of the stream processing.

The fast response processing layer includes a fast response processing apparatus 11 and a fast response processing result providing apparatus 12. The real-time processing layer includes a real-time processing apparatus 21 and a real-time processing result providing apparatus 22. The batch processing layer includes a storage 31 and a batch processing apparatus 32. The processing result providing layer includes a batch processing result providing apparatus 33. The devices included in the data processing system will be described below.

The fast response processing apparatus 11 receives the data and processes the data before the real-time processing apparatus 21. The fast response processing apparatus 11 transmits the processing result (hereinafter, referred to as a fast response processing result) to the real-time processing apparatus 21 and the fast response processing result providing apparatus 12.

The fast response processing result providing apparatus 12 retains the fast response processing result received from the fast response processing apparatus 11, and returns the fast response processing result in response to the query from the client.

The real-time processing apparatus 21 processes the data on the basis of the fast response processing result, and transmits the processing result (hereinafter, referred to as a real-time processing result) to the real-time processing result providing apparatus 22. The real-time processing apparatus 21 may transmit the real-time processing result to the fast response processing result providing apparatus 12. Upon receiving the real-time processing result, the fast response processing result providing apparatus 12 modifies the fast response processing result on the basis of the real-time processing result.

The real-time processing result providing apparatus 22 holds the real-time processing result and returns the real-time processing result in response to the query from the client.

The storage 31 stores all the data to be processed. In the batch processing layer, when the data is received, the data is stored in the storage 31.

The batch processing apparatus 32 processes all the data stored in the storage 31 at a predetermined timing, and transmits the processing result (hereinafter, referred to as a batch processing result) to the batch processing result providing apparatus 33.

The batch processing result providing apparatus 33 holds the batch processing result and returns the batch processing result in response to the query from the client.

Figure 2:
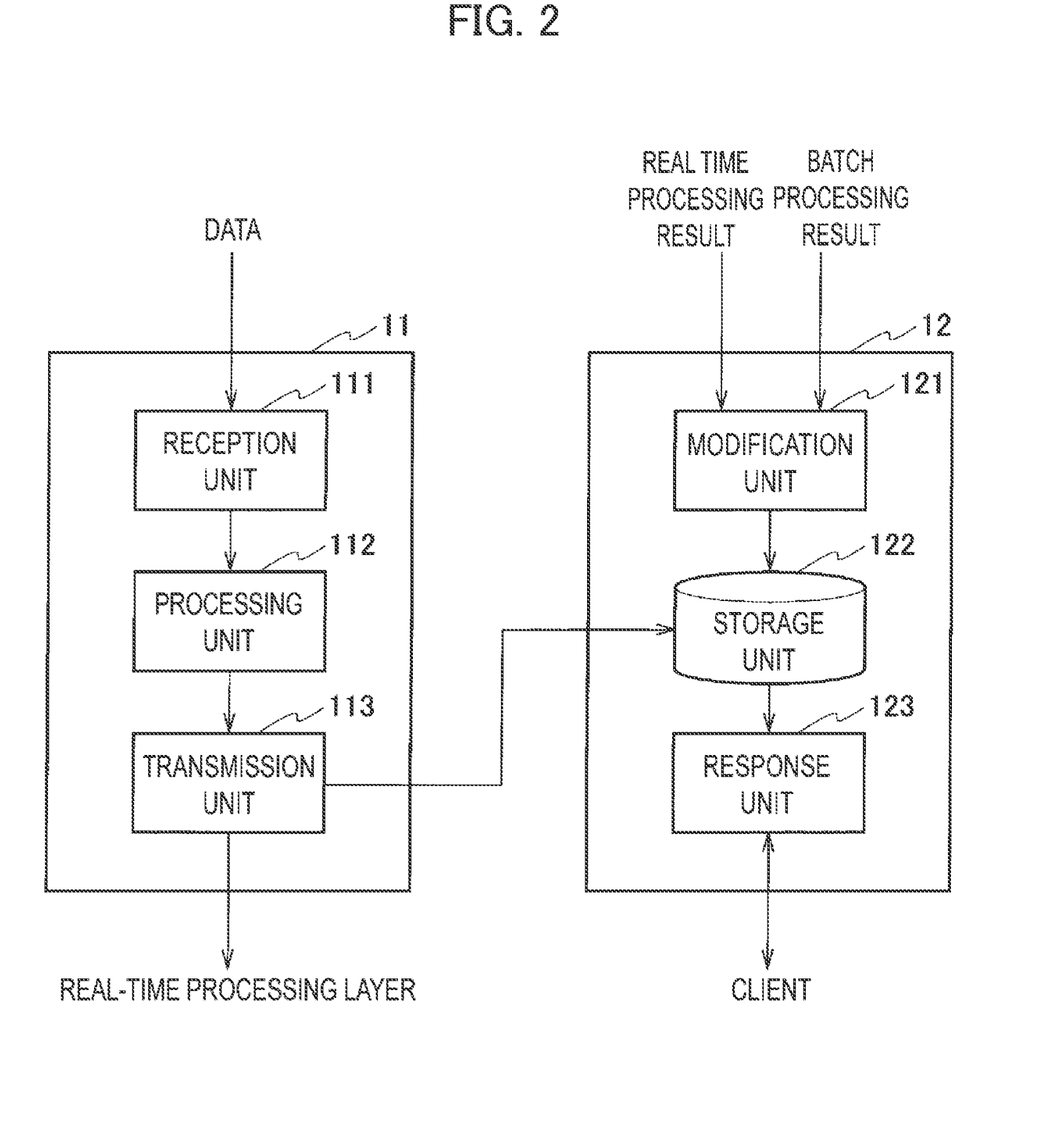
FIG. 2 is a diagram illustrating a configuration example of a fast response processing apparatus and a fast response processing result providing apparatus.

The fast response processing apparatus 11 and the fast response processing result providing apparatus 12 included in the fast response processing layer will be described with reference to FIG. 2. The fast response processing apparatus 11 illustrated in FIG. 2 includes a reception unit 111, a processing unit 112, and a transmission unit 113. The fast response processing result providing apparatus 12 includes a modification unit 121, a storage unit 122, and a response unit 123.

The reception unit 111 receives the data. The data is also transmitted to the batch processing layer.

The processing unit 112 processes the received data, to obtain the fast response processing result. This processing is a part of processing until obtaining the real-time processing result from the data, and is processing that is completed within a predetermined time.

The transmission unit 113 transmits the fast response processing result to the real-time processing layer and the fast response processing result providing apparatus 12.

The storage unit 122 stores the fast response processing result received from the fast response processing apparatus 11.

The response unit 123 returns the fast response processing result stored in the storage unit 122 in response to the query from the client.

The modification unit 121 receives the real-time processing result from the real-time processing layer, receives the batch processing result from the batch processing layer, and modifies the fast response processing result stored in the storage unit 122. For example, upon receiving the real-time processing result from the real-time processing layer, the modification unit 121 deletes the fast response processing result corresponding to the real-time processing result from the storage unit 122. Alternatively, the modification unit 121 may discard the fast response processing result and hold the real-time processing result.

An example of detecting an obstacle on the basis of an vehicle-mounted camera image and control area network (CAN) data transmitted by a vehicle using the data processing system of the present embodiment will be described with reference to FIG. 3.

When a system of a lambda architecture in the related art is used, in the batch processing layer, the data received from the vehicle is stored, and the type and position of the obstacle are determined using the data of a plurality of the vehicles. In the real-time processing layer, after the data is received from the vehicle, object detection/recognition processing and position estimation processing are performed, to determine the type and position of the obstacle. This example is applied to the data processing system of the present embodiment. In the example of FIG. 3, the object detection/recognition processing from the vehicle-mounted camera image is divided as the fast response processing layer.

The processing of the example of FIG. 3 will be described below. FIG. 3 illustrates flow of the data, the processing performed in the layers, and the data held in the layers.

In Step S11, the vehicle transmits the vehicle-mounted camera image and the CAN data to the fast response processing layer. In Step S12, the vehicle transmits the vehicle-mounted camera image and the CAN data to the batch processing layer.

In Step S13, in the fast response processing layer, an object is detected from the vehicle-mounted camera image, and processing for recognizing the object is performed. For example, in this processing, the presence or absence of the obstacle, the type of obstacle, and an approximate position of the obstacle is obtained as the fast response processing result. The approximate position is, for example, a photographing position and a photographing direction of the vehicle-mounted camera image. The vehicle-mounted camera image, the CAN data, and the fast response processing result are transmitted to the real-time processing layer.

In Step S14, the fast response processing result obtained in Step S13 is stored in the fast response processing layer. The fast response processing layer can reply to the query for the fast response processing result. For example, when the client (another vehicle) queries the fast response processing layer whether there is an obstacle at a certain position, the fast response processing layer searches for the fast response processing result in which the obstacle is present at the position, and returns the searched fast response processing result.

In Step S15, in the real-time processing layer, an exact position of the obstacle detected from the vehicle-mounted camera image is estimated on the basis of the vehicle-mounted camera image, the CAN data, and the fast response processing result.

In Step S16, the real time processing result including the type of the obstacle obtained in Step S13 and the position of the obstacle obtained in step S15 is stored, so that the real-time processing layer can reply to the query for the real-time processing result.

Further, in Step S17, the real-time processing result is transmitted to the fast response processing layer. The fast response processing layer modifies the fast response processing result on the basis of the real-time processing result.

Meanwhile, in Step S21, the received data is stored in the batch processing layer.

In Step S22, in the batch processing layer, the object detection/recognition processing and the position estimation processing are performed on the basis of the vehicle-mounted camera image and the CAN data from the plurality of vehicles at a predetermined interval or when a predetermined number of data has been stored.

In Step S23, the batch processing result including the type and position of the obstacle obtained in the batch processing layer is stored in the processing result providing layer. The processing result providing layer can reply to the query for the batch processing result.

Further, in Step S24, the batch processing result is transmitted to the fast response processing layer. The fast response processing layer modifies the fast response processing result on the basis of the batch processing result.

Here, time reduction when the data processing system of the present embodiment is used will be described. For example, in the real-time processing layer of the lambda architecture in the related art, it is assumed that time until the type and position of the obstacle can be obtained is six seconds. It is assumed that breakdown of processing time is as follows.

Figure 3:
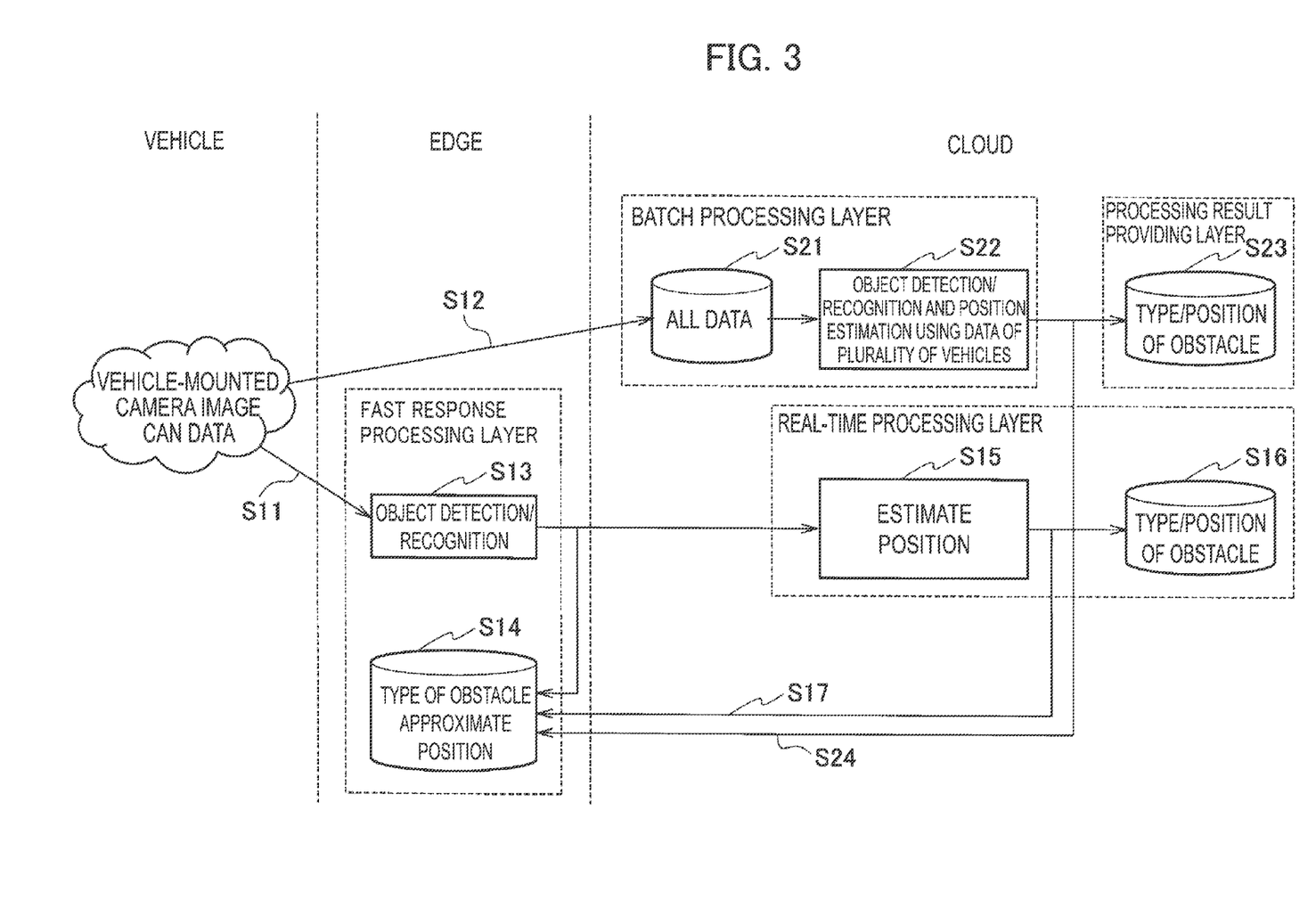
FIG. 3 is a diagram for explaining an example of detecting an obstacle on the basis of an vehicle-mounted camera image and CAN data.

Transmission processing of vehicle-mounted camera image and CAN data to cloud: two seconds
Object detection/recognition processing from vehicle-mounted camera image: one second Position estimation processing of detected object: three seconds In the example of FIG. 3, the object detection/recognition processing is divided into the fast response processing layer, so that the processing result of the object detection/recognition can be referred to. Thus, time from when the vehicle transmits the data until the information can be obtained from the fast response processing layer can be reduced by three seconds.

Furthermore, by arranging the fast response processing layer on an edge, if time required for the transmission processing of the vehicle-mounted camera image and the CAN data to the edge is one second, it can be further reduced by one second.

The query to the fast response processing layer can also be reduced in time. For example, it is assumed that time required for the query of the real-time processing result from the client is one second, in which communication delay to the cloud is 0.25 seconds and information search is 0.5 seconds. If the communication delay to the edge is 0.1 seconds, the time required for the query of the fast response processing result from the client can be reduced by 0.3 seconds.

Figure 4:
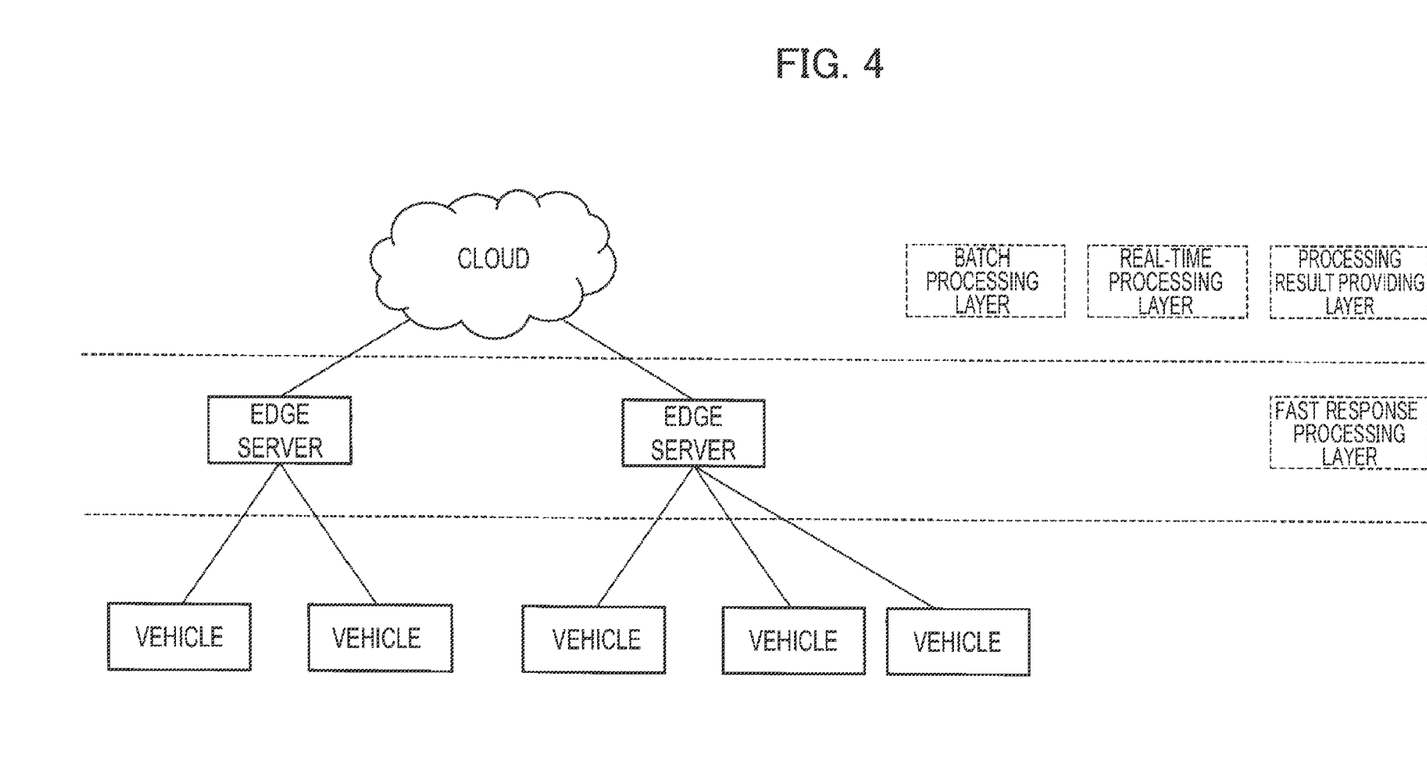
FIG. 4 is a diagram illustrating an arrangement example of layers in an edge computing environment.

The example of FIG. 3 can be realized in an edge computing environment of a tree structure having cloud as root, as illustrated in FIG. 4. The vehicle is communicatively connected to a base station to transmit the data and transmit the query. The edge server is deployed near the base station. The fast response processing layer is placed on the edge server, and the real-time processing layer, the batch processing layer, and the processing result providing layer are arranged in the cloud.

The data transmitted by the vehicle is subjected to fast response processing by means of the edge server near the base station to which the vehicle is communicatively connected, and is transmitted to the batch processing layer of the cloud. The fast response processing result obtained in the fast response processing layer is stored in the edge server so as to be able to reply to the query, and is transmitted to the real-time processing layer of the cloud.

When the vehicle queries the fast response processing result, the edge server of the base station, to which the vehicle is communicatively connected, returns the fast response processing result. The fast response processing result stored in the edge server of another base station, to which the vehicle is not communicatively connected, can be obtained via the cloud.

When desiring to refer to the real-time processing result and the batch processing result, the vehicle queries the cloud.

Figure 5:
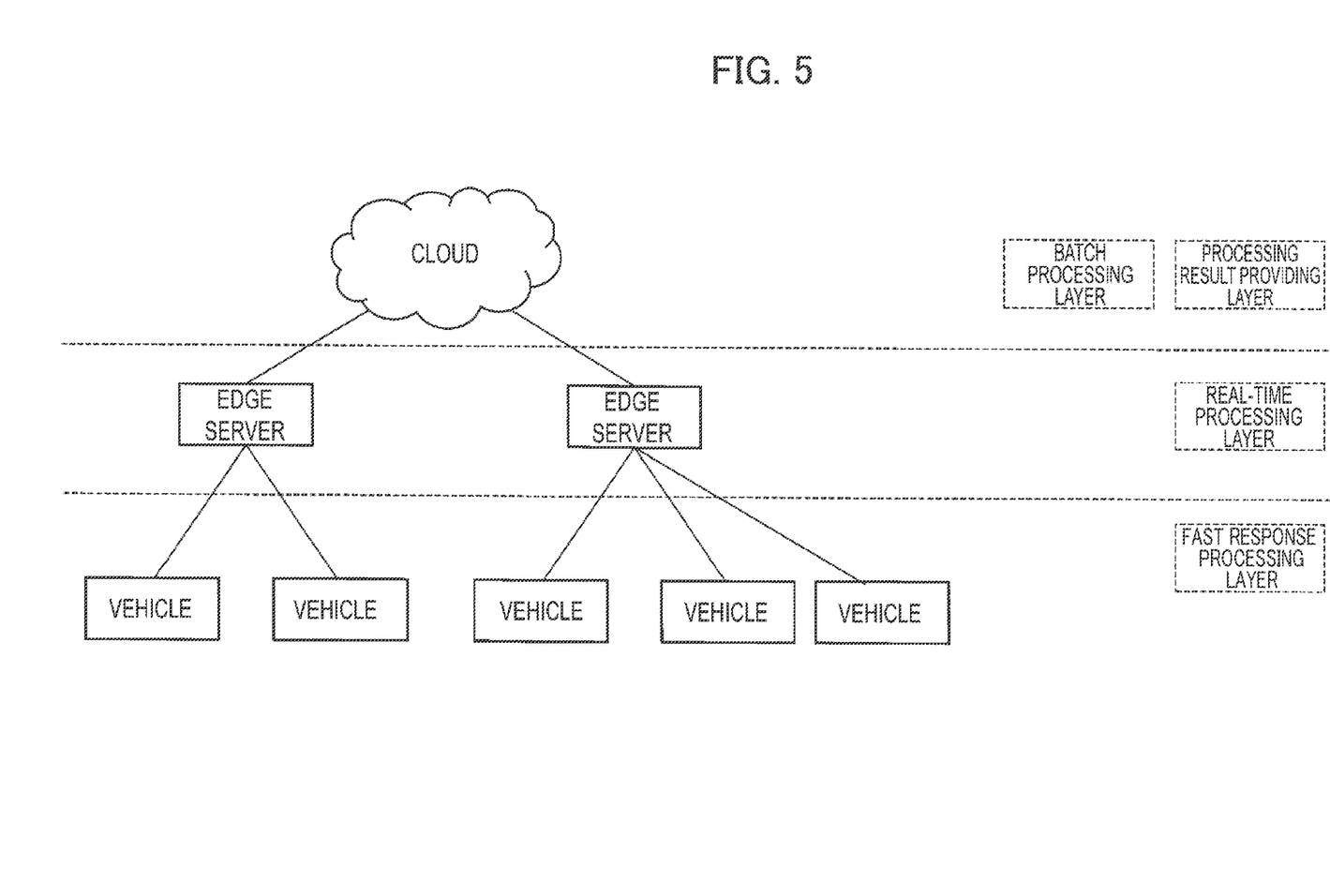
FIG. 5 is a diagram illustrating another arrangement example of the layers in the edge computing environment.

Further, when the vehicle (terminal) has high computing capability, the fast response processing layer may be placed in each vehicle as illustrated in FIG. 5. In FIG. 5, the real-time processing layer is placed on the edge server, and the batch processing layer and the processing result providing layer are placed in the cloud.

Each vehicle performs the fast response processing on data obtained from a sensor mounted on the vehicle, and transmits the data to the batch processing layer of the cloud. Each vehicle transmits the fast response processing result to the real-time processing layer and stores the result in each vehicle.

The vehicle can obtain the fast response processing result stored by another vehicle via the edge server. When the vehicles can communicate directly with each other, the vehicle may directly obtain the fast response processing result from the other vehicle.

As described above, the data processing system of the present embodiment is a data processing system to which the lambda architecture is applied, in which the received data is stream-processed and the data is batch-processed after storage, and includes: the fast response processing apparatus 11 that performs processing of a part of the stream processing on the received data; and the fast response processing result providing apparatus 12 that stores the processing result of the fast response processing apparatus 11 and replies to the query. Thus, the client can refer to the processing result of the real-time processing layer, which is less accurate than the batch processing but has a shorter processing time, until the processing result of the batch processing in the batch processing layer is output, and can further refer to the processing result of the part of the stream processing before the processing result of the stream processing in the real-time processing layer can be referred to. Since it is possible to refer to the processing result earlier than the lambda architecture in the related art, it is possible to speed up the response if decrease in accuracy of the processing result can be allowed.

In the data processing system of the present embodiment, in the stream processing, the processing is divided into the processing of the fast response processing layer in the order of the earliest processing so that the total processing time does not exceed a predetermined threshold value, and thus it is possible to present general-purpose division and arrangement of the processing, and to reduce a burden related to division and arrangement of application.

Figure 6:
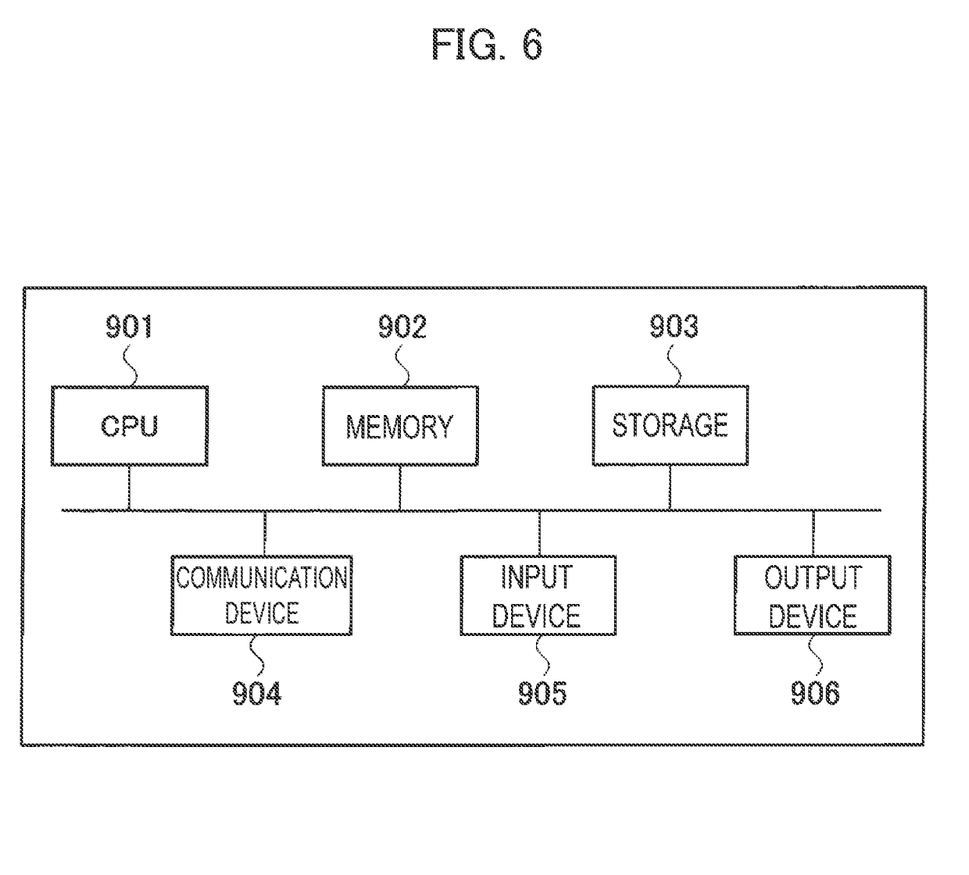
FIG. 6 is a diagram illustrating an example of a hardware configuration of the fast response processing apparatus and the fast response processing result providing apparatus.

As the fast response processing apparatus 11 and the fast response processing result providing apparatus 12 described above, for example, as illustrated in FIG. 6, a general-purpose computer system can be used. The general-purpose computer system includes a central processing unit (CPU) 901, a memory 902, a storage 903, a communication device 904, an input device 905, and an output device 906. In the computer system, the fast response processing apparatus 11 and the fast response processing result providing apparatus 12 are implemented by the CPU 901 executing a predetermined program loaded on the memory 902. The program can also be recorded on a computer readable recording medium such as a magnetic disk, an optical disc, or a semiconductor memory or can also be distributed through a network. The fast response processing apparatus 11 and the fast response processing result providing apparatus 12 may be a single apparatus.

REFERENCE SIGNS LIST

11 Fast response processing apparatus
111 Reception unit
112 Processing unit
113 Transmission unit
12 Fast response processing result providing apparatus
121 Modification unit
122 Storage unit
123 Response unit
21 Real-time processing apparatus
22 Real-time processing result providing apparatus
31 Storage
32 Batch processing apparatus
33 Batch processing result providing apparatus

The invention claimed is:

1. A data processing system that performs stream processing on received data and performs batch processing on the received data after storage, the data processing system comprising:
   a fast response processing apparatus disposed at an edge and comprising one or more processor configured to perform a part of the stream processing on the received data;
   a first result providing apparatus comprising one or more processor configured to store a first processing result of the fast response processing apparatus and return the first processing result in response to a query from one or more client terminal;
   a real-time processing apparatus comprising one or more processor configured to perform a remaining part of the stream processing on the first processing result received from the fast response processing apparatus;
   a second result providing apparatus comprising one or more processor configured to store a second processing result of the real-time processing apparatus and return the second processing result in response to the query;
   a storage configured to store the received data;
   a batch processing apparatus comprising one or more processor configured to perform the batch processing on the received data read from the storage at a predetermined timing; and
   a third result providing apparatus comprising one or more processor configured to store a third processing result of the batch processing apparatus and return the third processing result in response to the query,
   wherein the data processing system is a lambda architecture having a real-time processing layer and a batch processing layer, the fast response processing apparatus and the real-time processing apparatus belonging to the real-time processing layer, and the batch processing apparatus belonging to the batch processing layer, wherein the same received data is transmitted to both the real-time processing layer and the batch processing layer, and wherein the part of the stream processing is a group of processes extracted in order of execution from multiple processes in the stream processing such that a total processing time in the fast response processing apparatus does not exceed a predetermined threshold value.

2. A data processing system that performs stream processing on received data and performs batch processing on the received data after storage, the data processing system comprising:

a fast response processing apparatus disposed at an edge and comprising one or more processor configured to perform a part of the stream processing on the received data;

a first result providing apparatus comprising one or more processor configured to store a first processing result of the fast response processing apparatus and return the first processing result in response to a query from one or more client terminal;

a real-time processing apparatus comprising one or more processor configured to perform a remaining part of the stream processing on the first processing result received from the fast response processing apparatus;

a second result providing apparatus comprising one or more processor configured to store a second processing result of the real-time processing apparatus and return the second processing result in response to the query;

a storage configured to store the received data;

a batch processing apparatus comprising one or more processor configured to perform the batch processing on the received data read from the storage at a predetermined timing; and a third result providing apparatus comprising one or more processor configured to store a third processing result of the batch processing apparatus and return the third processing result in response to the query, wherein the data processing system is a lambda architecture having a real-time processing layer and a batch processing layer, the fast response processing apparatus and the real-time processing apparatus belonging to the real-time processing layer, and the batch processing apparatus belonging to the batch processing layer, wherein the same received data is transmitted to both the real-time processing layer and the batch processing layer, and wherein the one or more processor of the first result providing apparatus is configured to:
  receive at least one of the second processing result or the third processing result, and
  modify the first processing result using the at least one of the second processing result or the third processing result.

3. A fast response processing apparatus disposed at an edge and included in a data processing system that performs stream processing on received data and performs batch processing on the received data after storage, the fast response processing apparatus comprising:

a first storage configured to store a first processing result of a part of the stream processing; and a response unit comprising one or more processor configured to return the first processing result stored in the first storage in response to a query from one or more client terminal, wherein the data processing system is a lambda architecture having a real-time processing layer and a batch processing layer, the fast response processing apparatus and a real-time processing apparatus belonging to the real-time processing layer, and a batch processing apparatus belonging to the batch processing layer, wherein the same received data is transmitted to both the real-time processing layer and the batch processing layer, wherein a second result providing apparatus returns a second processing result of the real-time processing apparatus in response to the query, wherein a third result providing apparatus returns a third processing result of the batch processing apparatus in response to the query, wherein the part of the stream processing is a group of processes extracted in order of execution from multiple processes in the stream processing such that a total processing time in the fast response processing apparatus does not exceed a predetermined threshold value.

4. The fast response processing apparatus according to claim 3, further comprising:

a reception unit comprising one or more processor configured to receive the received data; and a processing unit comprising one or more processor configured to perform processing of the part of the stream processing on the received data.

5. The fast response processing apparatus according to claim 3, further comprising:

a modification unit comprising one or more processor configured to modify the first processing result stored in the first storage using at least one of the second processing result and the third processing result.

6. A non-transitory computer-readable storage medium storing a program that operates a computer disposed at an edge as a fast response processing apparatus and included in a data processing system that performs stream processing on received data and performs batch processing on the received data after storage, the fast response processing apparatus operated as:

a first storage configured to store a first processing result of a part of the stream processing; and a response unit configured to return the first processing result stored in the first storage in response to a query from one or more client terminal, wherein the data processing system is a lambda architecture having a real-time processing layer and a batch processing layer, the fast response processing apparatus and a real-time processing apparatus belonging to the real-time processing layer, and a batch processing apparatus belonging to the batch processing layer, wherein the same received data is transmitted to both the real-time processing layer and the batch processing layer, wherein a second result providing apparatus returns a second processing result of the real-time processing apparatus in response to the query, wherein a third result providing apparatus returns a third processing result of the batch processing apparatus in response to the query, wherein the part of the stream processing is a group of processes extracted in order of execution from multiple processes in the stream processing such that a total processing time in the fast response processing apparatus does not exceed a predetermined threshold value.

* * * * *